(12) United States Patent
Pike et al.

(10) Patent No.: US 8,261,266 B2
(45) Date of Patent: Sep. 4, 2012

(54) DEPLOYING A VIRTUAL MACHINE HAVING A VIRTUAL HARDWARE CONFIGURATION MATCHING AN IMPROVED HARDWARE PROFILE WITH RESPECT TO EXECUTION OF AN APPLICATION

(75) Inventors: Robert Pike, Woodinville, WA (US); Kushagra V. Vaid, Sammamish, WA (US); Robert Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 681 days.

(21) Appl. No.: 12/432,911

(22) Filed: Apr. 30, 2009

(65) Prior Publication Data
US 2010/0281482 A1 Nov. 4, 2010

(51) Int. Cl.
G06F 9/455 (2006.01)
G06F 9/46 (2006.01)
G06F 15/173 (2006.01)

(52) U.S. Cl. ............ 718/1; 718/104; 709/223; 709/224; 709/226

(58) Field of Classification Search ........................ 718/1
See application file for complete search history.

(56) References Cited

U.S. PATENT DOCUMENTS

| | | | |
|---|---|---|---|
| 7,203,944 B1 | 4/2007 | van Rietschote et al. | |
| 7,454,748 B2* | 11/2008 | Ari-Pekka et al. | 717/174 |
| 7,546,598 B2* | 6/2009 | Blumenthal et al. | 718/1 |
| 7,673,113 B2* | 3/2010 | Sugumar et al. | 711/170 |
| 7,707,579 B2* | 4/2010 | Rodriguez | 718/104 |
| 7,730,486 B2* | 6/2010 | Herington | 718/1 |
| 7,743,380 B2* | 6/2010 | Seidman et al. | 718/105 |
| 2006/0092851 A1 | 5/2006 | Edlund et al. | |
| 2006/0195715 A1* | 8/2006 | Herington | 714/4 |
| 2007/0130566 A1* | 6/2007 | van Rietschote et al. | 718/1 |
| 2007/0204266 A1* | 8/2007 | Beaty et al. | 718/1 |
| 2007/0245165 A1 | 10/2007 | Fung | |
| 2008/0022136 A1 | 1/2008 | Mattsson et al. | |
| 2008/0077366 A1 | 3/2008 | Neuse et al. | |
| 2008/0082977 A1 | 4/2008 | Araujo et al. | |
| 2008/0163239 A1* | 7/2008 | Sugumar et al. | 718/105 |
| 2008/0184229 A1 | 7/2008 | Rosu et al. | |
| 2009/0119664 A1* | 5/2009 | Pike et al. | 718/1 |

(Continued)

OTHER PUBLICATIONS

"International Search Report", Mailed Date: Nov. 26, 2010, Application No. PCT/US2010/032311, Filed Date: Apr. 23, 2010, Pages 9.

(Continued)

*Primary Examiner* — Jennifer To
(74) *Attorney, Agent, or Firm* — Capitol City TechLaw; Richard C. Irving

(57) ABSTRACT

A system and a method are provided. Performance and capacity statistics, with respect to an application executing on one or more VMs, may be accessed and collected. The collected performance and capacity statistics may be analyzed to determine an improved hardware profile for efficiently executing the application on a VM. VMs with a virtual hardware configuration matching the improved hardware profile may be scheduled and deployed to execute the application. Performance and capacity statistics, with respect to the VMs, may be periodically analyzed to determine whether a threshold condition has occurred. When the threshold condition has been determined to have occurred, performance and capacity statistics, with respect to VMs having different configurations corresponding to different hardware profiles, may be automatically analyzed to determine an updated improved hardware profile. VMs for executing the application may be redeployed with virtual hardware configurations matching the updated improved profile.

20 Claims, 6 Drawing Sheets

U.S. PATENT DOCUMENTS

2010/0138830 A1* 6/2010 Astete et al. ............... 718/1
2010/0199285 A1* 8/2010 Medovich ................. 718/104

OTHER PUBLICATIONS

Singh, et al., "Server-Storage Virtualization: Integration and Load Balancing in Data Centers", in Proceedings of IEEE/ACM Supercomputing, 2008, Pages 12.

"Data Center Automation Capability Solutions", Retrieved at<<http://www.ca.com/us/products/collateral.aspx?cid=187605>>, Oct. 6, 2008, Pages 3.

"Beyond Virtualization to the Reliable, Dynamic Data Center", Retrieved at<<http://jeremygeelan.sys-con.com/node/788815/mobile>>, Dec. 30, 2008, Pages 6.

"Managing Data Center Virtualization", Retrieved at<<http://documents.bmc.com/products/documents/94/77/59477/59477.pdf>>, Dec. 2005, Pages 40.

Turner, et al."IT Consolidation Solutions from Hewlett-Packard", Retrieved at<<http://h71000.www7.hp.com/openvms/whitepapers/it_consolidation.pdf>>, 2002, Pages 24.

"Microsoft System Center Virtual Machine", Retrieved at<<http://download.microsoft.com/download/4/d/b/4db1a6b2-292b-4fd9-8d0c-ed21afa9d368/SCVMM2008_Reviewer's_Guide_082808.pdf>>, Aug. 2008, Pages 72.

"Using VMware Infrastructure 3 with 3PAR Utility Storage in Datacenter Deployments", Retrieved at<<http://www.vmware.com/pdf/esx3_3par_util_stor.pdf>>, "VMware white paper", 2006, Pages 14.

* cited by examiner

US 8,261,266 B2

DEPLOYING A VIRTUAL MACHINE HAVING A VIRTUAL HARDWARE CONFIGURATION MATCHING AN IMPROVED HARDWARE PROFILE WITH RESPECT TO EXECUTION OF AN APPLICATION

BACKGROUND

Processing device and application utilization in many existing data centers is considerably less than optimal. For example, many data center managers overprovision processing device resources in data centers and, as a result, some processing devices in a data center may have only a 10% to 30% load, thereby leaving resources underutilized. Processing devices execute virtual machines (VMs) in some data centers. Because different applications have different resource requirements, making standard assumptions of generic VMs could result in degraded application efficiencies in data center processing devices.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a system may include a trending engine, a scheduler, a monitor, and a profiler. During an on-boarding process, a trending engine may capture performance and capacity statistics of virtual machines executing an application. The system may automatically learn an improved hardware profile by using a profiler to analyze the captured performance and capacity statistics. As a result of the analyzing, the trending engine may derive an improved hardware profile for executing the application. The scheduler may schedule and deploy one or more virtual machines having a virtual hardware configuration matching the derived improved hardware profile. After deployment, the monitor may periodically sample performance and capacity statistics of the deployed one or more virtual machines. When the monitor detects an occurrence of a threshold condition, the monitor may invoke the trending engine and the profiler to automatically derive an updated improved hardware profile. The scheduler may then redeploy the one or more virtual machines with a virtual hardware configuration matching the derived updated improved hardware profile.

In some embodiments, performance and capacity statistics may be collected and stored in a data repository. The profiler may analyze the performance and capacity statistics stored in the data repository. Performance and capacity statistics may be maintained and provided by one or more processing devices executing at least one VM. One or more load balancers may distribute a load for the application among the one or more VMs based on application response times.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Figure 1:
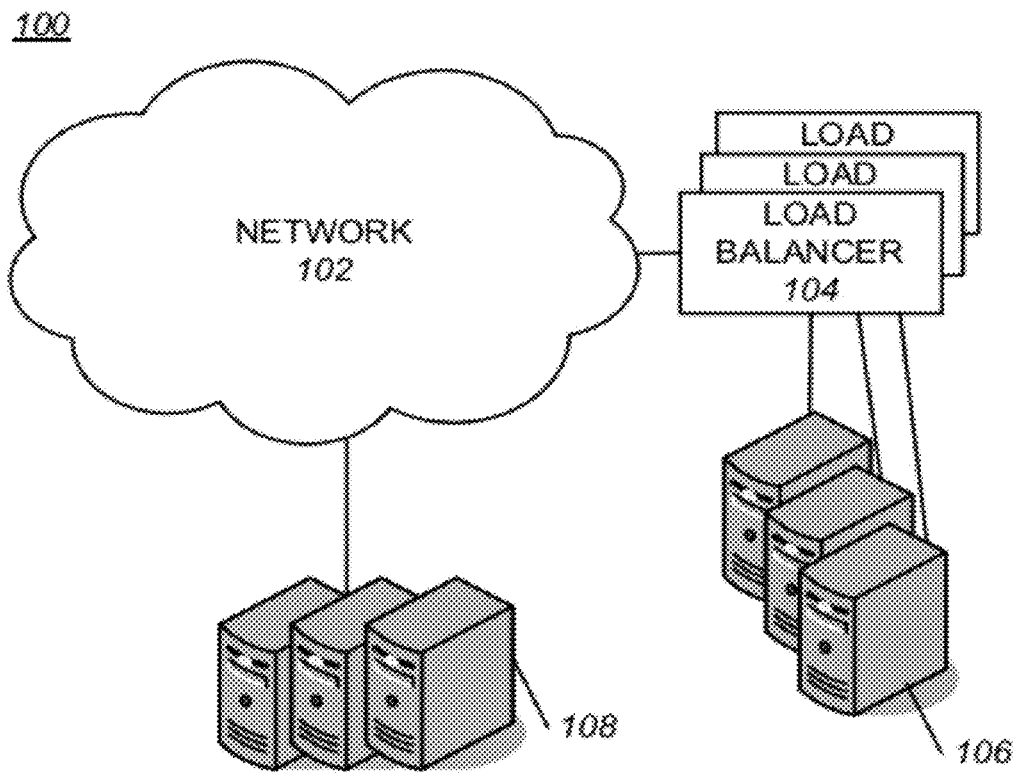
FIG. 1 illustrates an exemplary operating environment in which an embodiment of a system consistent with the subject matter of this disclosure may be implemented.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a data center may include an application efficiency engine for loading an application into multiple VMs having varying virtual hardware configurations. One or more load balancers may be arranged to distribute a load among the multiple VMs based on respective determined response times of the application executing in the VMs. Performance and capacity statistics, with respect to the VMs executing the application, may be collected and stored in a data repository. The performance and capacity statistics in the data repository may be accessed and analyzed to automatically profile the application and derive an improved hardware profile. A scheduler may determine at least one processing device having available resources for a VM having a virtual hardware configuration matching the derived hardware profile. The scheduler may then deploy the VM for executing the application.

In some embodiments, performance and capacity statistics of VMs executing the application may be monitored by a processing device. The processing device may access a data repository, which may store performance and capacity statistics, as well as application response time statistics. Alternatively, the processing device may query one or more other devices, such as, for example, a load balancer, a server, or other device, to obtain the performance and capacity statistics and application response time statistics (collectively, referred to as the statistics) with respect to an application executing on a VM. The processing device may analyze the statistics to determine whether a threshold condition has occurred with respect to the application executing on one or more VMs. A threshold condition may be determined to have occurred when one of a number of conditions has occurred. In one embodiment, the conditions may include:

1. a first predefined change in processor utilization, of the one or more VMs executing the application, lasting at least a first given period of time;
2. a second predefined change in memory allocation, of the one or more VMs executing the application, lasting at least a second given period of time;
3. a third predefined change in an amount of input/output activity with respect to a medium, such as, for example, a hard disk drive or other medium, used by the one or more VMs executing the application and lasting at least a third given period of time;
4. a fourth predefined change in an amount of network input/output lasting at least a fourth given period of time, with respect to the one or more VMs executing the application; and
5. a fifth predefined change in application response time of an application executing on the one or more VMs and lasting at least a fifth given period of time.

The above-described threshold conditions are exemplary. In other embodiments consistent with the subject matter of this disclosure, additional, or different threshold conditions may be defined.

If at least one of the threshold conditions is determined to have occurred, then the application efficiency engine may again load the application into multiple VMs with varying virtual hardware configurations, the statistics may be accessed and analyzed to automatically profile the application and derive an improved hardware profile, and the scheduler may again determine at least one processing device having available resources for a VM having a virtual hardware configuration matching the derived improved hardware profile. The scheduler may then redeploy the one or more VMs, for executing the application, with virtual hardware configurations matching the derived improved hardware configuration.

Exemplary Operating Environment

FIG. 1 illustrates an exemplary operating environment 100 for embodiments consistent with the subject matter of this disclosure. Operating environment 100 may include a network 102, one or more load balancers 104, first processing devices 106, and second processing devices 108.

Network 102 may be a local area network, or other type of network. Network 102 may be a wired or wireless network and may be connected with other networks, such as, for example, the Internet.

Load balancer(s) 104 may communicate with co-located processing devices, or with remote processing devices over network 102. When load balancer(s) 104 receives a load, such as, for example, data or other information for an application executing on one of a number of VMs residing on first processing device(s) 106, load balancer(s) 104 may deliver the load to one of the VMs executing the application on one of first processing device(s) 106 that has a shortest application response time. In some operating environments, load balancer(s) 104 may be a commercially available load balancer(s), which deliver a load to a VM having a shortest application response time from among a number of VMs. Various embodiments of load balancer(s) 104 may be implemented in hardware, or may be implemented in software on a processing device included in load balancer(s) 104. In one embodiment, load balancer(s) 104 may include load balancer(s) available from F5 of Seattle, Wash.

Each of first processing device(s) 106 may have one or more VMs executing thereon. In some embodiments, each of first processing device(s) 106 may be a server. Each of the VMs may have a virtual hardware configuration and at least some of the VMs may execute a copy of the application. A virtual hardware configuration may include a number of processors, such as, for example, core processors, an amount of allocated memory, and an amount of allocated storage space, such as, for example, disk storage space, or other storage space. In some embodiments, a virtual hardware configuration may include additional, or other, configuration information.

Second processing device(s) 108 may include one or more processing devices. Second processing device(s) 108 may execute: a profiler for use in executing the application in VMs having a number of virtual hardware configurations; a trending engine for profiling an application executing on one or more VMs with varying virtual hardware configurations in order to derive an improved hardware profile; a scheduler for determining one of first processing device(s) 106 having available resources for executing a VM with a virtual hardware configuration matching a derived improved hardware profile and for deploying a VM on the determined one of first processing devices(s); and a monitor for monitoring performance and capacity statistics with respect to VMs executing the application and for causing a cycle to repeat in order to derive another improved hardware profile when at least one threshold condition has occurred. The trending engine, the profiler, the scheduler, and the monitor may execute in a same processing device of second processing device(s) 108, separate processing devices of second processing device(s) 108, or may execute in multiple processing devices of second processing device(s) 108, such that at least one of the trending engine, the profiler, the scheduler, and the monitor may execute in a same processing device of second processing device(s) 108 as at least one other of the trending engine, the profiler, the scheduler, and the monitor. In some embodiments, one or more of second processing device(s) 108 may also be included as a first processing device of first processing device(s) 106. In other embodiments, none of processing device(s) 108 may be included among first processing device(s) 106.

Operating environment 100, shown in FIG. 1, is exemplary and illustrates first processing device(s) 106 including three processing devices, second processing device(s) 108 including three processing devices, and load balancer(s) 104 including three load balancers. However, in other embodiments, first processing device(s) 106, second processing device(s) 108, and load balancer(s) 104 may include fewer or additional first processing device(s) 106, second processing device(s) 108, and load balancer(s) 104, respectively.

Figure 2:
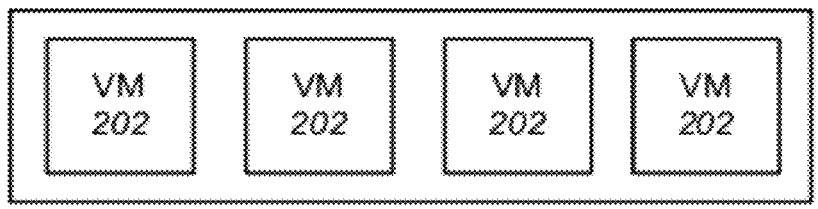
FIG. 2 shows an exemplary processing device on which multiple VMs may execute.

FIG. 2 illustrates an exemplary processing device 200 of first processing device(s) 106. Exemplary processing device 200 may include multiple VMs 202. For example, processing device 200 may include four core processors, each of which may be allocated for use with a respective VM. Alternatively, a different number of VMs may be deployed to execute on processing device 200. For example, some VMs may be allocated one of the four core processors and other VMs may be allocated two or more of the four core processors.

Processing device 200 is an exemplary processing device. In other embodiments, processing device 200 may include more or fewer core processors and a different number of VMs may be executing thereon.

Exemplary Processing Device

Figure 3:
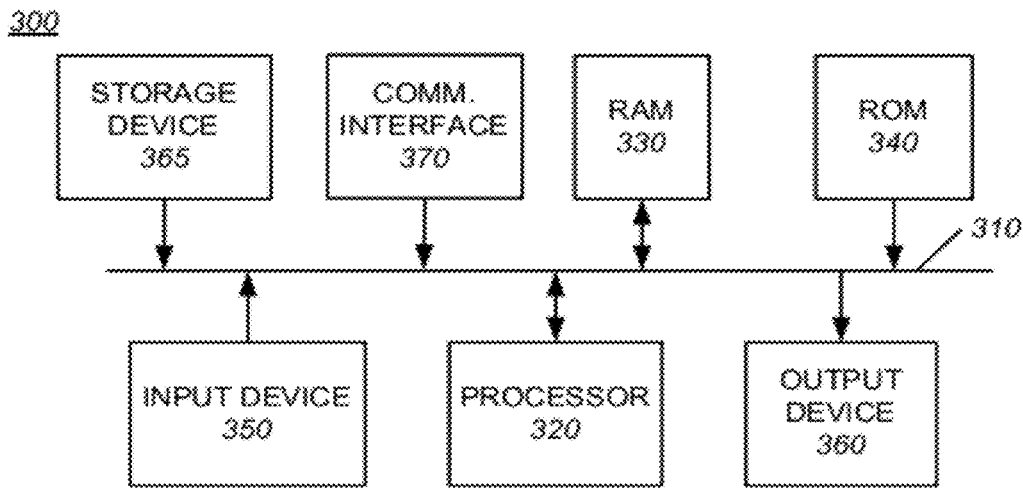
FIG. 3 illustrates an exemplary processing device, which may be used to implement various aspects of embodiments.

FIG. 3 is a functional block diagram of an exemplary processing device 300, which may be used to implement embodiments of a first processing device 106 and/or a second processing device 108 consistent with the subject matter of this disclosure. Processing device 300 may be a server or other type of processing device. Processing device 300 may include a bus 310, a processor 320, a random access memory (RAM) 330, a read only memory (ROM) 340, an input device 350, an output device 360, a storage device 365, and a communication interface 370. Bus 310 may permit communication among components of processing device 300.

Processor 320 may include one or more conventional processors that interpret and execute instructions. A memory may include RAM 330, ROM 340, or another type of dynamic or static storage device that stores information and instructions for execution by processor 120. RAM 330, or another type of dynamic storage device, may store instructions as well as temporary variables or other intermediate information used during execution of instructions by processor 320. ROM 140, or another type of static storage device, may store static information and instructions for processor 320.

Input device 350 may include a keyboard, a pointing device, an electronic pen, a touchscreen, or other device for providing input. Output device 360 may include a display, a printer, or other device for outputting information. Storage device 365 may include a disk and disk drive, an optical medium, or other medium for storing data and/or instructions. Communication interface 370 may include a transceiver for communicating via a wired or wireless connection to a device via a network.

Processing device 300 may perform functions in response to processor 320 executing sequences of instructions contained in a tangible machine-readable medium, such as, for example, RAM 330, ROM 340 or other medium. Such instructions may be read into RAM 330 from another machine-readable medium or from a separate device via communication interface 370.

Exemplary System

Figure 4:
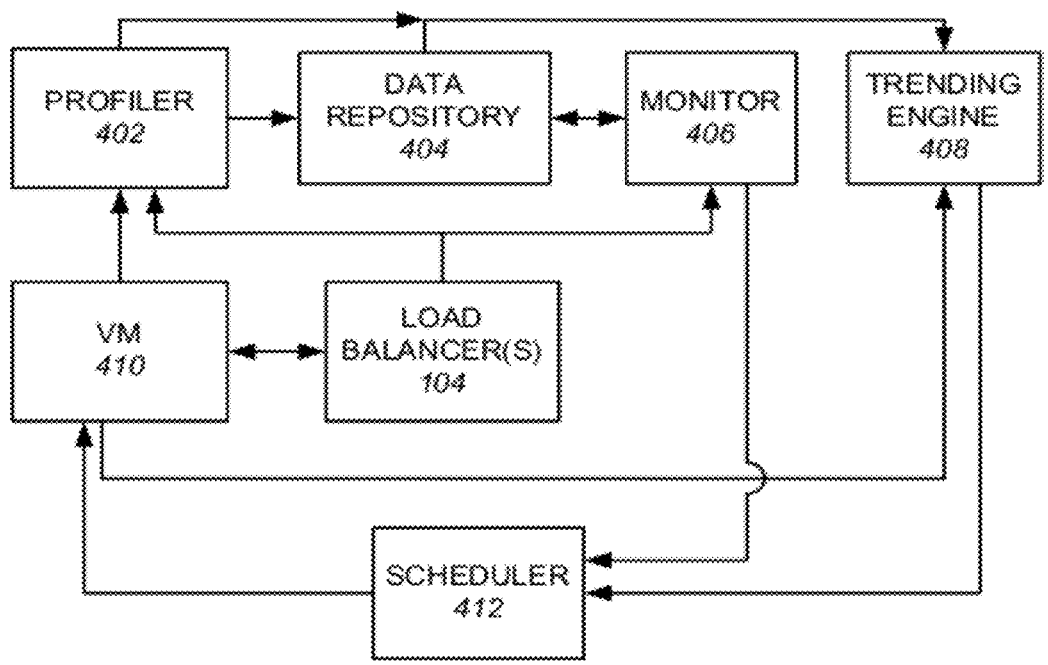
FIG. 4 is a functional block diagram illustrating functional components of an exemplary system consistent with the subject matter of this disclosure.

FIG. 4 illustrates a functional diagram of an exemplary system 400 implementing an application efficiency engine consistent with the subject matter of this disclosure. System 400 may include a profiler 402, a data repository 404, a monitor 406, a trending engine 408, one or more VMs 410, a scheduler 412, and one or more load balancer(s) 104.

Profiler 402 may collect performance and capacity statistics from processing device(s) 106 executing VMs 410 having various virtual hardware configurations and executing a same application. The performance and capacity statistics may include processor utilization, amount of memory allocated, number of inputs/outputs per fixed unit of time (for example, seconds or other suitable fixed unit of time) to a medium, such as a disk or other medium, amount of storage space available and/or used on the medium, network utilization, as well as other statistics. Profiler 402 may also collect application response time statistics.

In some embodiments, the application response time statistics may be collected from load balancer(s) 104. In other embodiments, the application response time statistics may be collected from other devices. The application response time statistics may include a number of transactions processed per second (or other suitable fixed unit of time) by an application executing on any of VMs 410. In other embodiments, additional, or different performance and capacity statistics and/or application response time statistics may be collected.

In some embodiments, profiler 402 may collect performance and capacity statistics and application response time statistics directly from first processing device(s) 106 and load balancer(s) 104, respectively. In other embodiments, profiler 402 may access data repository 404, which may store performance and capacity statistics and application response time statistics collected from respective sources by at least one of first and second processing device (s) 106, 108.

Monitor 406 may execute on at least one of first and second processing device(s) 106, 108. Monitor 406 may obtain performance and collection statistics from first processing device(s) 106 and application response time statistics from load balancer(s) 104 or other devices and may store the performance and collection statistics and the application response time statistics, as well as other information, in data repository 404. In some embodiments, the other information may include a time indication, an indication of a particular VM, an indication of a particular one of first processing device(s) 106 from which statistics were collected, as well as other data. In other embodiments, the other information may include additional, or different, data.

Trending engine 408 may execute on at least one of first and second processing device(s) 106, 108. Trending engine 408 may access the collected performance and capacity statistics, as well as the application response time statistics, which may be stored in data repository 404 or provided by profiler 402. Trending engine 408 may analyze the statistics to derive an improved hardware profile, which trending engine 408 may then provide to scheduler 412.

Scheduler 412 may determine a processing device from first processing device(s) 106 that has available resources to support the derived improved hardware profile. Scheduler 412 may then schedule and deploy, on the determined processing device, a VM 410 with a virtual hardware configuration matching the derived improved hardware profile.

If, at some point, monitor 406 determines an occurrence of a threshold condition, with respect to VM 410 executing the application, monitor 406 may inform scheduler 412 to schedule and deploy VMs 410 having a number of virtual hardware configurations and monitor 406 may further inform profiler 402 to collect performance and capacity statistics, as well as application response time statistics, in order to derive an updated improved hardware profile. Alternatively, if monitor 406 determines an occurrence of a threshold condition, with respect to VM 410 executing the application, monitor 406 may inform profiler 402, which may inform scheduler 412 to schedule and deploy VMs 410 having a number of virtual hardware configurations. Profiler 402 may then collect performance and capacity statistics, as well as application response time statistics, in order to derive an updated improved hardware profile. This will be discussed in more detail below.

Exemplary Processing

Figure 5:
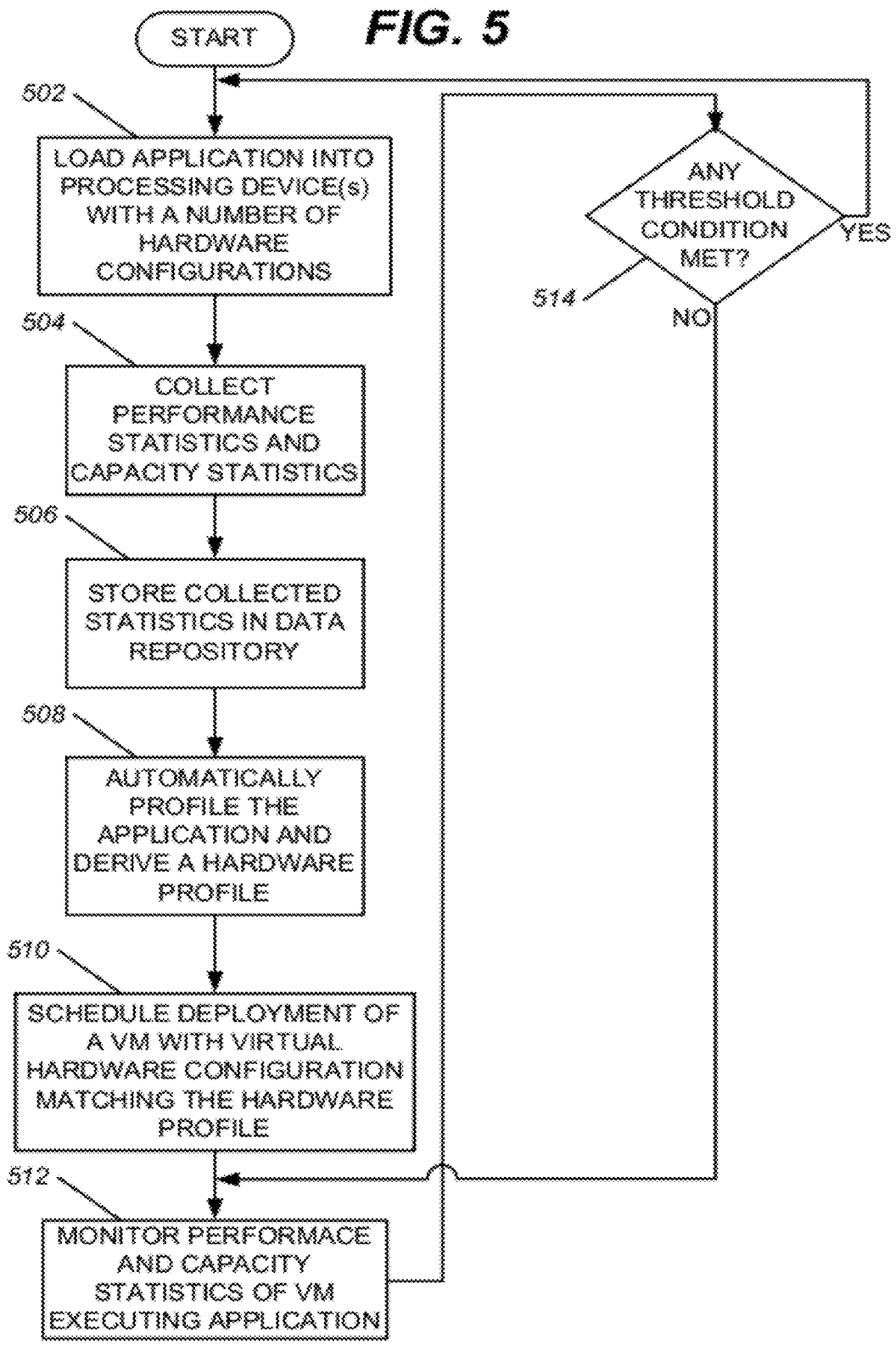
FIG. 5 is a flowchart illustrating an exemplary process, which may be implemented in embodiments consistent with the subject matter of this disclosure.

FIG. 5 is a flowchart of an exemplary process that may be performed in various embodiments consistent with the subject matter of this disclosure. The process may begin with scheduler 412 deploying, onto processing device(s) 106, a number of VMs 410 having respective virtual hardware configurations (act 502). Profiler 402 may collect statistics directly from devices, such as, for example, performance and capacity statistics from processing device(s) 106 and application response time statistics from load balancer(s) 104, or other devices (act 504). Profiler 402 may store the collected statistics in data repository 404 (act 506) and may call or inform trending engine 408 to profile the application. Trending engine 408 may access the collected statistics stored in data repository 404 to automatically profile the application and derive an improved hardware profile (act 508).

Figure 6:
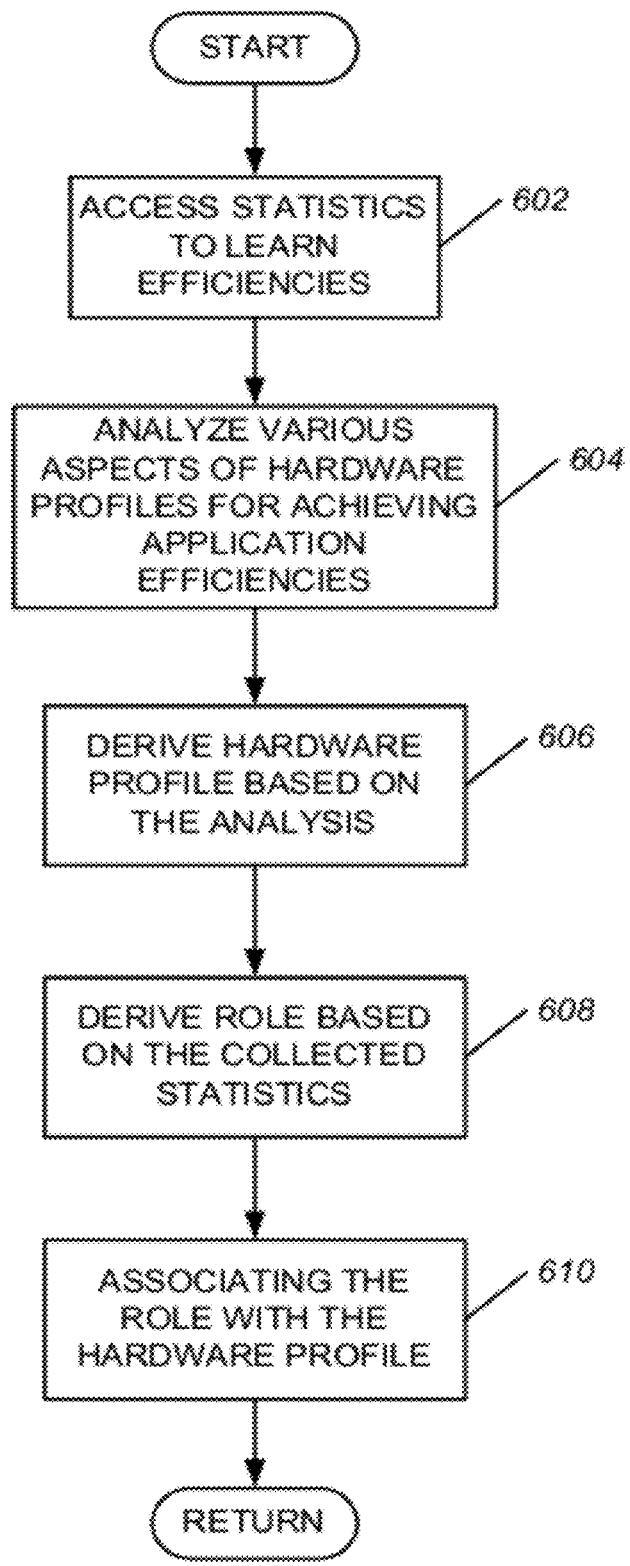
FIG. 6 is a flowchart illustrating an exemplary process for automatically profiling applications and deriving an improved hardware profile.

FIG. 6 is a flowchart illustrating exemplary processing with respect to trending engine 408 in an embodiment consistent with the subject matter of this disclosure. The process may begin with trending engine 408 accessing the collected statistics in data repository 404 in order to learn improved application efficiencies with respect to various virtual hardware configurations (act 602). Next, trending engine 408 may analyze various aspects of hardware profiles for achieving the improved application efficiencies (act 604).

Figure 7:
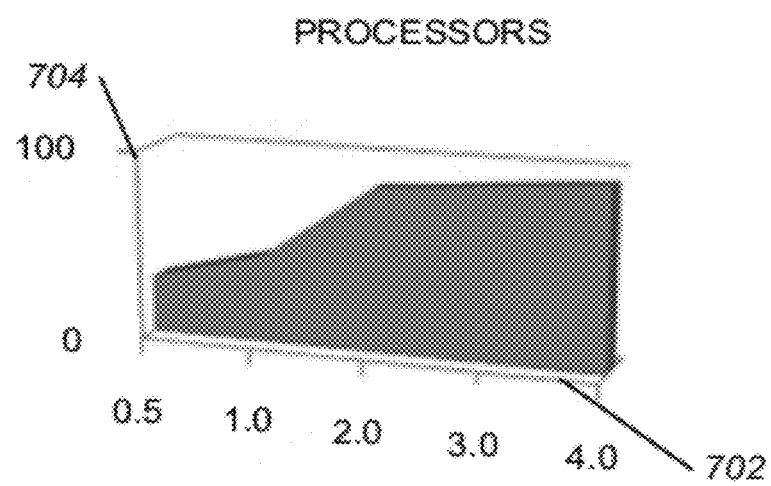
FIGS. 7 and 8 are graphs illustrating an analysis, which may be performed when deriving an improved hardware profile.
Figure 8:
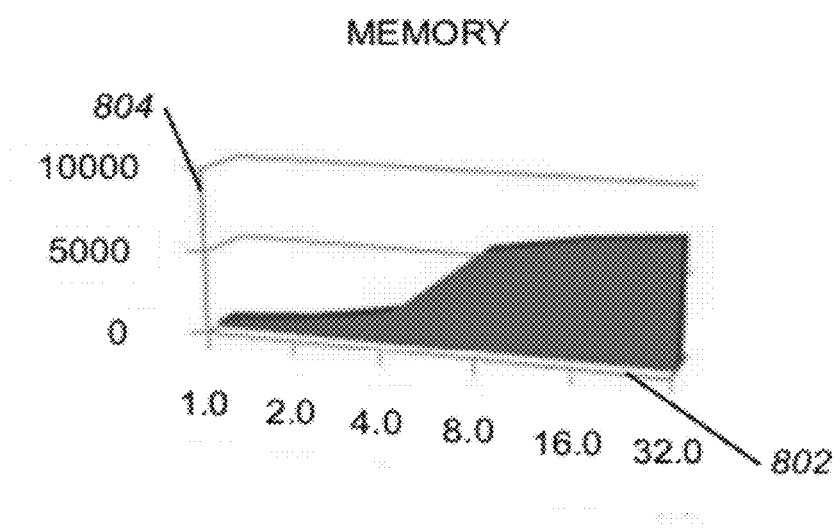

FIGS. 7 and 8 illustrate an exemplary analysis of various aspects of hardware profiles. FIG. 7 is a graph in which a number of processors is represented along axis 702 and a percentage of processor utilization is represented along axis 704. As one can see by viewing the graph, when 0.5 processors is allocated, processor utilization is approximately 30%. When one processor is allocated, processor utilization rises to about 45%. When two processors are allocated, processor utilization increases to about 85%. When allocating additional processors, processor utilization rises very slightly. For example, when three processors are allocated, processor utilization increases to about 87.5%, and when four processors are allocated, processor utilization increases to about 90%. Thus, after allocating two processors, adding more processors does not significantly increase processor utilization. When analyzing processor utilization with respect to a number of processors, profiler 408 may select a number of processors at which a slope of the graph is less then a predefined value, such as, for example, 0.2, or another suitable value, for at least a predefined length along axis 702. In this example, profiler 408 may select two processors as an improved number of processors.

Similarly, FIG. 8 is a graph in which a number of gigabytes (GB) of RAM is represented along axis 802 and a number of transactions per second is represented along axis 804. As one can see, when 1 GB of memory is allocated, about 1000 transactions per second may be processed. When 2 GB of memory are allocated, about 1,800 transactions per second may be processed. When 4 GB of memory are allocated, about 2,250 transactions per second may be processed. When 8 GB of memory are allocated, a significant increase in a number of transactions processed per second may be observed (in this example, about 5,100 transactions per second). When 16 GB of memory are allocated, a small increase in the number of transactions processed per second may be observed (in this example, about 6,100 transactions per second). When 32 GB of memory are allocated, about 7,000 transactions per second may be processed. One can observe that after 8 GB of memory are allocated adding additional memory does not significantly increase a number of transactions processed per second. When analyzing an amount of memory to allocate with respect to a number of transactions processed per second, profiler 408 may select an amount of memory at which a slope of the graph is less then a predefined value, such as, for example, 0.2, or another suitable value, for at least a predefined length along axis 802. In this example, profiler 408 may select 8 GB of memory as an improved amount of memory.

Returning to FIG. 6, trending engine 408 may derive an improved hardware profile based on the analysis performed during act 604 (act 606). Trending engine 408 may then derive a role based on the collected statistics, or the derived hardware profile (act 608). Roles may include front end processor, SQL protocol server, as well as other roles. Each of the roles may be defined as a range of hardware profiles. Profiler 408 may derive a role based on matching the derived hardware profile to one of the range of hardware profiles corresponding to a role. Trending engine 408 may then associate the derived role with the derived hardware profile, such that any VMs 410 having a role matching the derived role may have a virtual hardware configuration corresponding to the derived hardware profile (act 610). configuration corresponding to the derived hardware profile.

Returning to FIG. 5 scheduler 412 may schedule deployment of a VM 410 with a virtual hardware configuration matching the derived hardware profile (act 510).

Figure 9:
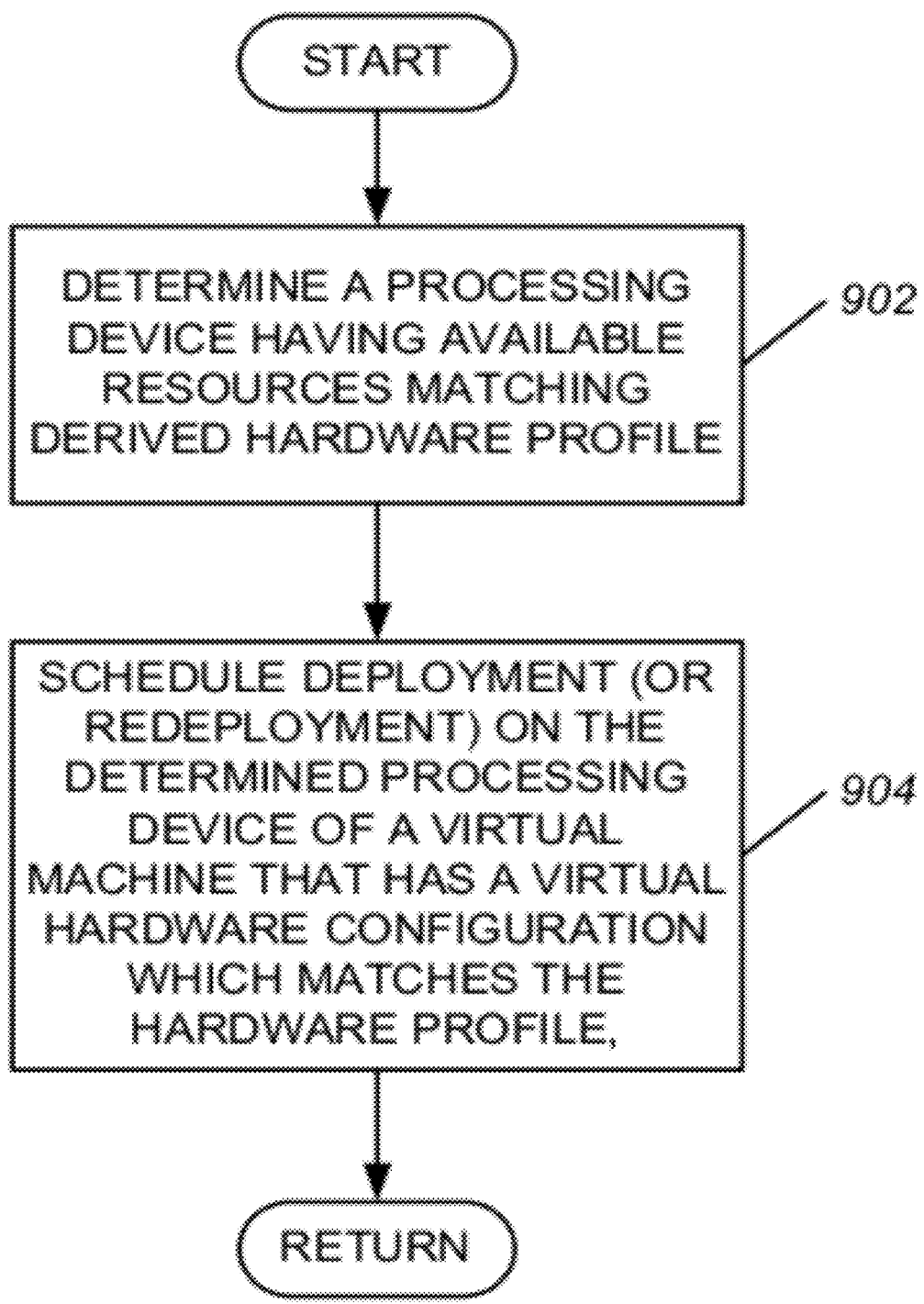
FIG. 9 is a flowchart explaining an exemplary process, which may be performed in embodiments consistent with the subject matter of this disclosure, for scheduling and deploying a virtual machine with a virtual hardware configuration matching the derived improved profile.

FIG. 9 is a flowchart illustrating exemplary processing which may be performed by scheduler 412. First, scheduler 412 may determine a processing device from among first processing devices 106 having at least an amount of available resources matching the derived hardware profile (act 902). Scheduler 412 may then schedule deployment, or redeployment, on the determined first processing device 106, of a VM 410 having a virtual hardware configuration which matches the derived hardware profile (act 904).

Returning to FIG. 5, monitor 406 may monitor performance and capacity statistics of VMs 410 executing the application (act 512). Monitor 406 may query devices, such as for example, ones of first processing device(s) 106 having VMs 410 executing the application and load balancer(s) 104 providing load to the ones of processing device(s) 106. Alternatively, the statistics may be collected and stored in data repository 404 by one of first and second processing devices 106, 108 and monitor 406 may access the collected statistics stored in data repository 404 in order to monitor the performance and capacity statistics.

Monitor 406 may then determine whether a threshold condition, from among a number of threshold conditions, has occurred with respect to any VM 410 executing the application (act 514). In one embodiment, the threshold conditions may include: a first predefined change in processor utilization lasting at least a first given period of time, a second predefined change in memory allocation lasting at least a second given period of time, a third predefined change in an amount of input/output activity to a medium lasting at least a third given period of time, a fourth predefined change in an amount of network input/output over a fourth given period of time, and a fifth predefined change in application response time lasting at least a fifth given period of time.

If no threshold condition has occurred, then monitor 406 may continue to monitor the statistics of the ones of first processing device(s) 106 having VMs 410 executing the application and load balancer(s) 104 providing load to the ones of first processing device(s) 106 (act 512). Otherwise, monitor 406 may inform scheduler 412 to deploy VMs 410 and load the application into first processing device(s) 106 with a number of virtual hardware configurations (act 502) and monitor 406 may inform trending engine 402 to collect the statistics (act 504).

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process, such as the processes illustrated in FIGS. 5, 6 and 9, may be different and/or may include additional or other acts.

Accordingly, the appended claims and their legal equivalents define embodiments, rather than any specific examples given.

We claim as our invention:

1. A method for automatically learning an improved hardware profile for an application, the method comprising:
    collecting, by a first processing device of one or more processing devices of an operating environment, performance statistics of the application executing in a plurality of hardware configurations;
    automatically profiling the application, by the first processing device or a second processing device of the one or more processing devices of the operating environment, based on the collected performance statistics to derive an improved hardware profile with respect to the application;
    scheduling, by the first processing device, the second processing device or a third processing device of the one or more processing devices of the operating environment, deployment of a virtual machine on a first other processing device of a plurality of other processing devices, the virtual machine having a virtual hardware configuration matching the derived improved hardware profile;
    deploying the virtual machine, on the first other processing device, for executing the application;
    monitoring, by one of the first processing device, the second processing device, the third processing device or a fourth processing device of the one or more processing devices of the operating environment, performance statistics of the application executing on the first other processing device;
    calculating, by one of the first processing device, the second processing device, the third processing device, the fourth processing device or a fifth processing device of the one or more processing devices of the operating environment, processor utilization, amount of memory allocated, number of inputs/outputs per fixed unit of time with respect to a medium, storage space used or available with respect to the medium, and network utilization, with respect to the application executing on the deployed virtual machine; and
    deriving, by one of the first processing device, the second processing device, the third processing device, the fourth processing device, the fifth processing device or a sixth processing device of the one or more processing devices of the operating environment, an updated improved hardware profile based on the monitoring, the deriving of the updated improved hardware profile being based, at least in part, on the processor utilization, the amount of memory allocated, the number of inputs/outputs per fixed unit of time with respect to a medium, the storage space used or available with respect to the medium, and the network utilization.

2. The method of claim 1, wherein the automatic profiling of the application further comprises:
    deriving a role associated with the application based on the collected performance statistics, and
    associating the role with the hardware profile.

3. The method of claim 2, further comprising:
    performing, by any processing device of the one or more processing devices, the scheduling of a redeployment of the virtual machine, a virtual hardware configuration of the virtual machine matching the derived updated improved hardware profile; and
    redeploying the virtual machine on the first other processing device or a second other processing device of the plurality of other processing devices.

4. The method of claim 3, further comprising:
    associating the role with the updated improved hardware profile.

5. The method of claim 1, wherein the scheduling of deployment of a virtual machine further comprises:
    comparing the improved hardware profile to available virtual machine resources on the plurality of other processing devices,
    determining one of the plurality of other processing devices as having at least available machine resources matching the improved hardware profile, and
    scheduling deployment of the virtual machine on the determined one of the plurality of other processing devices.

6. The method of claim 1, further comprising:
    distributing, by one or more load balancers, a load for a plurality of copies of the application executing in a plurality of virtual machines with different virtual hardware configurations, the distributing of the load being based on respective response times of the plurality of copies of the application, wherein
    the collecting of the performance statistics further include:
        collecting application response time data reported by the one or more load balancers.

7. The method of claim 1, further comprising:
    analyzing a plurality of hardware profiles with respect to an efficiency achieved by a plurality of virtual machines executing the application and having a virtual hardware configuration matching ones of the plurality of hardware profiles, wherein
    the derived improved hardware profile is based, at least in part, on a result of the analyzing.

8. The method of claim 1, further comprising:
    periodically receiving performance and capacity statistics, associated hardware profile information and application response time information, with respect to a deployed virtual machine, while the application is executing on the deployed virtual machine;
    analyzing the periodically received performance and capacity statistics, the associated hardware profile information and the application response time information to determine whether at least one performance threshold condition of a plurality of threshold conditions has occurred; and
    deriving the updated hardware profile when the at least one performance threshold condition of the plurality of threshold conditions has been determined to occur, the plurality of threshold conditions including a first predefined change in processor utilization lasting at least a first given period of time, a second predefined change in memory allocation lasting at least a second given period of time, a third predefined change in an amount of input/output activity to a medium lasting at least a third given period of time, a fourth predefined change in an amount of network input/output lasting at least a fourth given period of time, and a fifth predefined change in application response time lasting at least a fifth given period of time.

9. A system for automatically learning a hardware profile for a virtual machine to execute an application at an improved efficiency, the system comprising:
    at least one processing device, each of the at least one processing device comprising:

at least one processor,
a communication interface for communicating via a network, and
a memory, the communications interface and the memory being connected with the at least one processor;
the memories of one or more of the at least one processing device having instructions for performing a method comprising:
collecting performance and capacity statistics with respect to an application executing in a plurality of hardware configurations;
accessing the collected performance and capacity statistics to automatically profile the application and derive a hardware profile and a role of the application, the role of the application being associated with the hardware profile, a virtual machine having a virtual hardware configuration that matches the derived hardware profile being a configuration for executing the application at an improved efficiency;
matching the hardware profile to a physical processing device having at least enough available resources for the virtual machine having the virtual hardware configuration that matches the derived hardware profile;
deploying the virtual machine on the physical processing device;
monitoring performance statistics of the application executing on the deployed virtual machine;
calculating processor utilization, amount of memory allocated, number of inputs/outputs per fixed unit of time with respect to a medium, storage space used or available with respect to the medium, and network utilization, with respect to the application executing on the deployed virtual machine; and
deriving an updated improved hardware profile based on the monitoring, the deriving of the updated improved hardware profile being based, at least in part, on the processor utilization, the amount of memory allocated, the number of inputs/outputs per fixed unit of time with respect to a medium, the storage space used or available with respect to the medium, and network utilization.

10. The system of claim 9, further comprising:
at least one load balancer to distribute a load for a plurality of copies of the application executing in a plurality of virtual machines with a plurality of virtual hardware configurations, the at least one load balancer to distribute the load based on application response times of the executing copies of the application.

11. The system of claim 10, wherein:
the at least one load balancer maintains application response time statistics of the copies of the applications executing in the plurality of virtual machines, and
the method further comprises collecting the application response time statistics from the at least one load balancer.

12. The system of claim of claim 9, wherein the method further comprises:
detecting, as a result of the monitoring, a performance change beyond a threshold level, with respect to the executing application; and
automatically deriving an updated hardware profile.

13. The system of claim 9, wherein the hardware profile is derived based, at least in part, on analyzing a plurality of hardware profiles with respect to an efficiency achieved by respective virtual machines executing the application and having virtual hardware configurations matching ones of the plurality of hardware profiles.

14. The system of claim 9, wherein the method further comprises:
periodically receiving performance and capacity statistics, associated hardware profile information and application response time information, with respect to a deployed virtual machine, while the application is executing on the deployed virtual machine;
analyzing the periodically received performance and capacity statistics, the associated hardware profile information and the application response time information to determine whether at least one performance threshold condition of a plurality of threshold conditions has occurred; and
deriving the updated hardware profile when the at least one performance threshold condition of the plurality of threshold conditions has been determined to occur, the plurality of threshold conditions including a first predefined change in processor utilization lasting at least a first given period of time, a second predefined change in memory allocation lasting at least a second given period of time, a third predefined change in an amount of input/output activity to a medium lasting at least a third given period of time, a fourth predefined change in an amount of network input/output lasting at least a fourth given period of time, and a fifth predefined change in application response time lasting at least a fifth given period of time.

15. A processing device comprising:
at least one processor;
a communications interface for communicating via a network; and
a memory, the communications interface, the at least one processor, and the memory being connected with each other, the memory including a plurality of instructions for the processing device to perform a method comprising:
accessing collected performance and capacity statistics and associated hardware profile information with respect to an application executing on a virtual machine,
analyzing the collected performance and capacity statistics and the associated hardware profile information and deriving a hardware profile corresponding to a virtual hardware configuration for a virtual machine to execute the application with an improved efficiency,
providing information regarding the derived hardware profile to a scheduler for scheduling and deploying a virtual machine having a virtual hardware configuration matching the hardware profile;
periodically receiving performance and capacity statistics, associated hardware profile information and application response time information, with respect to a deployed virtual machine, while the application is executing on the deployed virtual machine,
analyzing the periodically received performance and capacity statistics, the associated hardware profile information and the application response time information to determine whether at least one performance threshold condition of a plurality of threshold conditions has occurred, and
deriving an updated hardware profile when the at least one performance threshold condition of the plurality of threshold conditions has been determined to occur, the plurality of threshold conditions including a first predefined change in processor utilization lasting at least a first given period of time, a second predefined change in memory allocation lasting at least a second given period of time, a third predefined change in an amount of input/output activity to a medium lasting at least a third given period of time, a fourth predefined change in an amount of network input/output lasting at least a fourth given period of time, and a fifth predefined change in application response time lasting at least a fifth given period of time.

16. The processing device of claim 15, wherein the analyzing the collected performance and capacity statistics and the associated hardware profile information and deriving a hardware profile for a virtual machine to execute the application with an improved efficiency further comprises:

analyzing a plurality of hardware profiles with respect to an efficiency achieved by a plurality of virtual machines executing the application and having virtual hardware configurations matching ones of the plurality of hardware profiles.

17. The processing device of claim 15, wherein:

the accessing collected performance and capacity statistics, and associated hardware profile information with respect to an application executing on a virtual machine, further comprises:

accessing application response time information with respect to the application executing on the virtual machine, and the analyzing the collected performance and capacity statistics and the associated hardware profile information and deriving a hardware profile for a virtual machine to execute the application with an improved efficiency further comprises:

analyzing the application response time information with respect to the application executing on the virtual machine.

18. The processing device of claim 15, wherein the method further comprises:

accessing, from a data repository, performance and capacity statistics, and associated hardware profile information with respect to an application executing on a plurality of virtual machines having a plurality of virtual hardware configurations.

19. The processing device of claim 15, wherein the method further comprises:

calculating, based on the collected performance and capacity statistics and the associated hardware profile information, processor utilization, amount of memory allocated, number of inputs/outputs per fixed unit of time with respect to a medium, storage space used or available with respect to the medium, and network utilization, with respect to the application executing on the deployed virtual machine.

20. The processing device of claim 19, wherein the method further comprises:

deriving the updated improved hardware profile based, at least in part, on the processor utilization, the amount of memory allocated, the number of inputs/outputs per fixed unit of time with respect to a medium, the storage space used or available with respect to the medium, and the network utilization.

* * * * *